United States Patent [19]

Bird et al.

[11] Patent Number: 5,190,324
[45] Date of Patent: Mar. 2, 1993

[54] PIPE RESTRAINING MEMBER

[75] Inventors: Edwin A. Bird, Ashdown, Ark.; Kirby L. Shaddix, Texarkana, Tex.

[73] Assignee: M&FC Holding Company, Inc., Wilmington, Del.

[21] Appl. No.: 788,425

[22] Filed: Nov. 6, 1991

[51] Int. Cl.$^5$ .............................. F16L 35/00
[52] U.S. Cl. ..................... 285/328; 285/419; 285/373; 285/368; 285/337
[58] Field of Search ............... 285/114, 368, 412, 337, 285/414, 413, 328, 373, 419

[56] References Cited

U.S. PATENT DOCUMENTS

| | | | |
|---|---|---|---|
| 2,507,261 | 5/1950 | Mercier | 285/132 |
| 2,738,993 | 3/1956 | Wilson | 285/90 |
| 3,252,192 | 5/1966 | Smith | 24/81 |
| 3,652,110 | 3/1972 | Manton | 285/368 |
| 3,790,194 | 2/1974 | Kimberley | 285/373 |
| 4,150,848 | 4/1979 | Dryup | 285/238 |
| 4,336,959 | 6/1982 | Roche | 285/368 |
| 4,372,587 | 2/1983 | Roche | 285/238 |
| 4,568,112 | 2/1986 | Bradley et al. | 285/238 |
| 4,583,770 | 4/1986 | Kréku et al. | 285/373 |
| 4,898,407 | 2/1990 | Zeidler | 285/328 |

FOREIGN PATENT DOCUMENTS

| | | | |
|---|---|---|---|
| 1420486 | 11/1965 | France | 285/368 |
| 0679629 | 12/1964 | Italy | 285/368 |

Primary Examiner—Randolph A. Reese
Assistant Examiner—Heather Chun
Attorney, Agent, or Firm—Lorusso & Loud

[57] ABSTRACT

A pipe restraining member comprising a collar member, flanges disposed on the collar member for connecting the collar member to a support, the collar member and the support being adapted cooperatively to encircle a first pipe member, lugs disposed on the collar member for connecting the collar member to a collar assembly encircling a second pipe member, and discrete groups of protrusions extending inwardly from an inside surface of the collar member and adapted to engage an external surface of the first pipe.

32 Claims, 5 Drawing Sheets

PIPE RESTRAINING MEMBER

BACKGROUND OF THE INVENTION

1. Field of the Invention

This invention relates to pipe restraining members and is directed more particularly to a collar member comprising at least one part of a pipe restraining assembly.

2. Description of the Prior Art

The provision of restraining assemblies suitable for retaining adjacent ends of pipes in a fixed position relative to each other is well known.

In U.S. Pat. No. 3,252,192, issued May 24, 1966, in the name of Joseph B. Smith, there is disclosed a pipe restraining assembly including two collar assemblies, one of which is installed proximate an end of one of the pipes. Each collar assembly includes two collar members which are provided with flanges adapted to be bolted together to form a pipe encircling collar assembly. Each of the two collar assemblies is provided with lugs which receive tie bolts to connect the collar assemblies to each other. Internally of the collar members are gripping surfaces adapted to engage the external surfaces of the pipes. To enhance pipe-gripping capability, the collar member gripping surfaces of Smith are provided with a layer of particles which are adapted to embed in the external surfaces of the pipes.

Examples of other restraining assemblies having collar members with gripping surfaces include U.S. Pat. No. 4,372,587, issued Feb. 8, 1983, in the name of Charles W. Roche, and U.S. Pat. No. 4,568,112, issued Feb. 4, 1986, in the name of Earl C. Bradley et al., in which serrations are used to engage and grip the pipe members.

It is common practice in the pipe jointing industry to dimension the internal radius of collar members substantially equal to the external radius of the pipe to which the collar members are to be applied. When protrusions are placed on the internal surface of the collar member, such protrusions extend inwardly of the radius of the collar member and therefore inwardly of the radius of the pipe. Such practice has been believed to insure intimate contact between the collar member internally extending protrusions and the pipe exterior. However, when a collar member is so configured, it often results in the protrusions nearest the flange portions at the ends of the collar member being forced over the pipe during installation, with the protrusions scraping along and biting into the exterior of the pipe until they come to their final position. Inasmuch as the collar member usually is formed of a relatively massive and unyielding band of metal, to insure longevity in service, the collar member has little resiliency to aid in installation, that is, in slipping over the pipe when there are interfering internal projections on the collar member.

It has been found that in the use of protrusions, including teeth, prongs, or the like, the protrusions nearest the ends of the collar member generally bite substantially deeper into the pipe than do the protrusions at or near the center of the collar member. In extreme instances, the end protrusions have been found to bite deeply into the pipe, while the center protrusions fail to touch the pipe. Accordingly, it would be beneficial if protrusions on the gripping surfaces of restraining collar members were configured and dimensioned such that contact and engagement with the pipe retained thereby were more nearly uniform.

SUMMARY OF THE INVENTION

It is, therefore, an object of the invention to provide a pipe restraining collar member having protrusions extending internally thereof, the protrusions being configured, dimensioned and arranged so as to engage a pipe substantially uniformly.

With the above and other objects in view, as will hereinafter appear, a feature of the present invention is the provision of a pipe restraining collar member having flange means disposed on the collar member and adapted to receive first connection means for connecting the collar member to support means, the collar member and the support means being adapted cooperatively to encircle a first pipe member, lug means disposed on the collar member and adapted to receive second connecting means for connecting the collar member to a collar assembly encircling a second pipe member, and groups of protrusions extending inwardly from an inside surface of the collar member and adapted to engage an external surface of the first pipe, the groups including a first group of protrusions of greater height than a second group of protrusions.

In accordance with a further feature of the invention, in the pipe restraining member described immediately above, the first group of protrusions is disposed centrally of the collar member, as viewed along the axis of the first pipe member, and the second group of protrusions comprises first and second sub-groups, the first sub-group being disposed outboard of the first group on a first side of the collar member, and the second sub-group being disposed outboard of the first group on a second side of the collar member.

In accordance with a still further feature of the invention, the collar member comprises a band portion having the afore-mentioned protrusions extending from the inside surface thereof, and a reinforcing rib portion extending from an external surface of the band portion centrally along the length of the band portion and generally normal to the external surface of the band portion.

The above and other features of the invention, including various novel details of construction and combinations of parts, will now be more particularly described with reference to the accompanying drawings and pointed out in the claims. It will be understood that the particular device embodying the invention is shown by way of illustration only and not as a limitation of the invention. The principles and features of this invention may be employed in various and numerous embodiments without departing from the scope of the invention.

BRIEF DESCRIPTION OF THE DRAWINGS

Reference is made to the accompanying drawings in which are shown illustrative embodiments of the invention, from which its novel features and advantages will be apparent.

In the drawings.

DESCRIPTION OF THE PREFERRED EMBODIMENT

Figure 9:
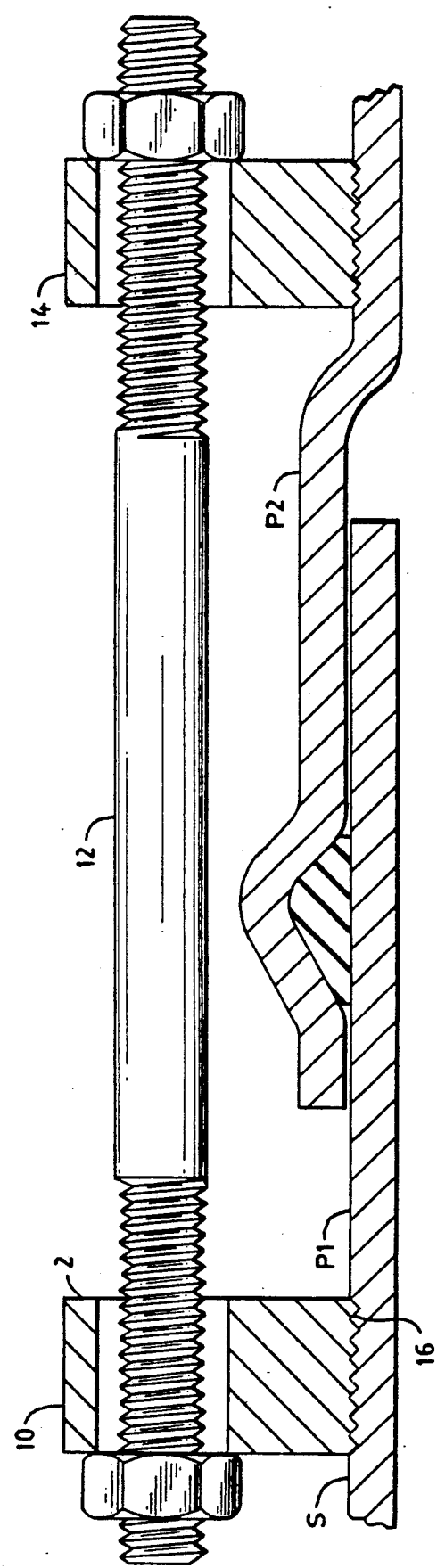
FIG. 9 is a generally centerline sectional view of a pipe restraining assembling of the type in which the above pipe restraining collar members find utility.

Referring to FIGS. 1-5, it will be seen that a restraining member illustrative of the present invention comprises a collar member 2 having flanges 4 thereon, the flanges 4 being adapted to receive first connecting means, such as bolts 6, for connecting the collar member 2 to support means 8 (FIG. 1), which may be one or more collar members similar to the collar member 2. The collar member 2 and the support means 8 are adapted cooperatively to encircle a first pipe member P1 (FIG. 9). The collar member 2 is provided with one or more lugs 10 adapted to receive second connecting means, such as tie bolts 12 for connecting the collar member 2 to a collar assembly 14 (FIG. 9) encircling a second pipe P2.

The collar member 2 is provided with protrusions 16 extending inwardly from an inside surface 18 of the collar member 2 and adapted to engage an external surface S of the first pipe P1. The protrusions 16 are arranged in at least two discrete groups, each group having protrusions therein different in height from the protrusions of the other group.

Figure 1:
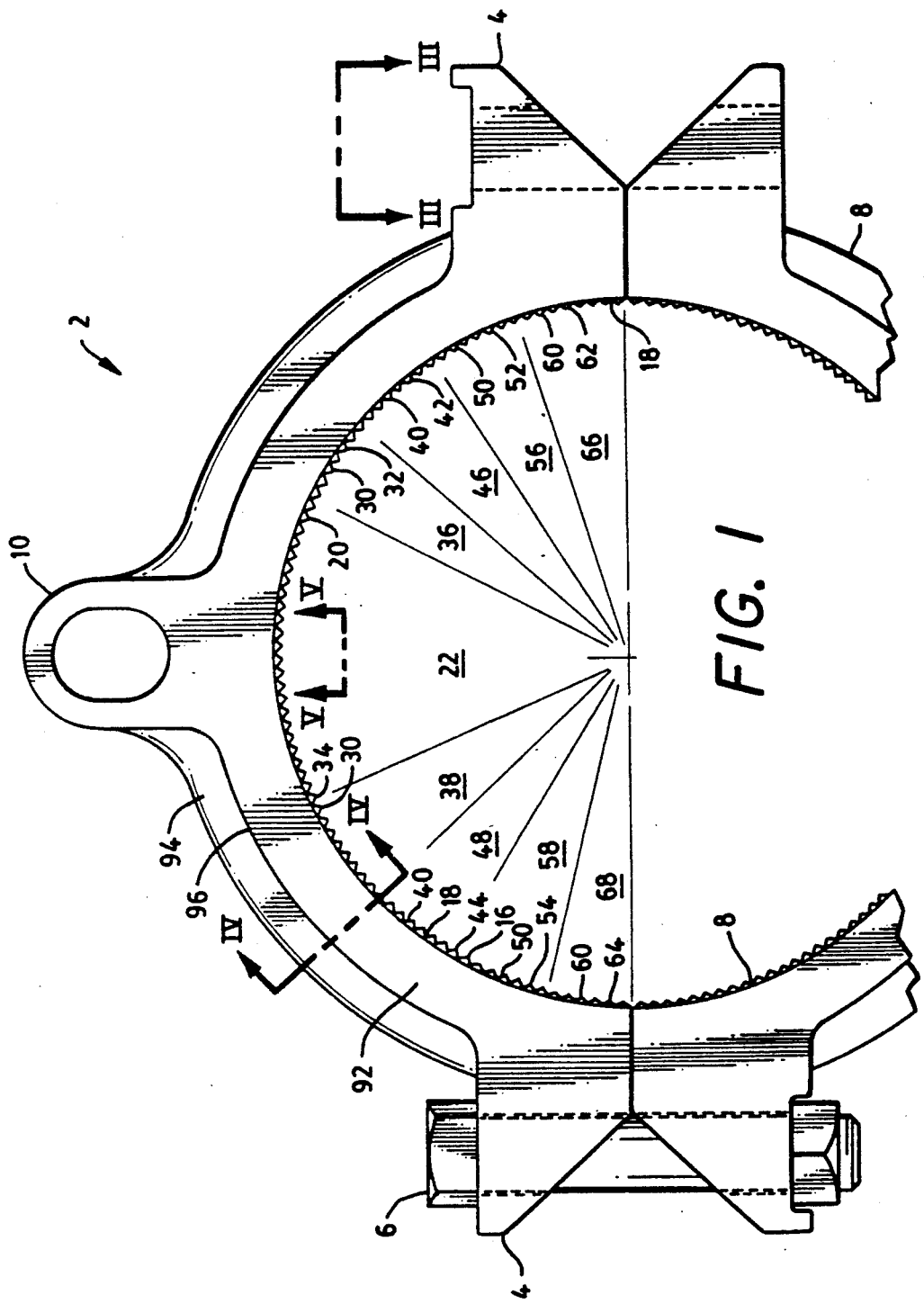
FIG. 1 is a front elevational view of one form of pipe restraining collar member illustrative of an embodiment of the invention.
Figure 2:
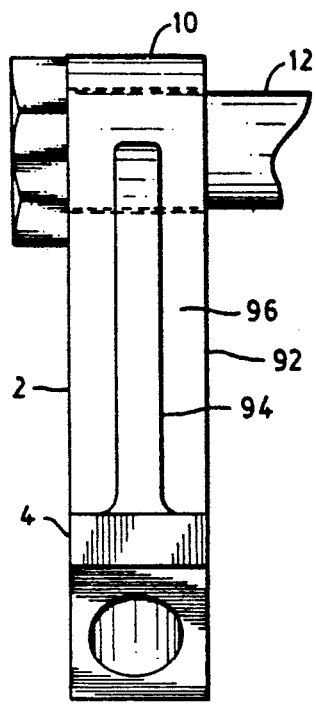
FIG. 2 is a side elevational view thereof.
Figure 3:
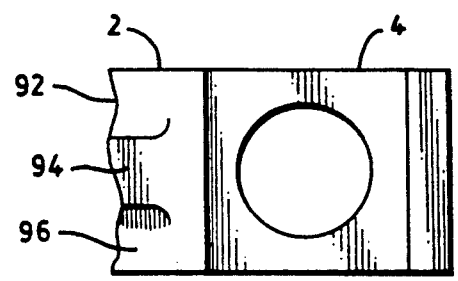
FIG. 3 is a top plan view of a portion thereof, taken along line III—III of FIG. 1.

A first group 20 of protrusions is disposed in a first zone 22 located centrally of the collar member 2, as viewed along the axis of the collar member, or, as seen in FIG. 1 of the drawings. A second group 30 of protrusions comprises first and second sub-groups 32, 34 disposed in second and third zones 36, 38, respectively, located one on either side outboard of the first group 20 in the first zone 22. The protrusions of the first group 20 are of substantially equal height and are provided with a greater height than the protrusions of the second group 30. The protrusions of the second group 30 are of substantially equal height. The first zone 22 is disposed on the inside surface 18 of the collar member 2 through an arc of about 30°-90°, and preferably through an arc of about 60°. The first and second sub groups 32, 34 are each disposed on the inside surface 18 of the collar member 2 through an arc of 180°, less the arc occupied by the first group 20, divided by two. The protrusions of the first group 20 are provided with a height of less than about 0.10 inch, and preferably about 0.065-0.075 inch. As noted above, the protrusions of the second group 30 are of lesser height. The protrusions of the first and second groups are conical in configuration and have substantially equal base diameters, preferably about 0.120-0.130 inch.

Referring to FIG. 1, it will be seen that the arrangement of protrusions preferably includes a third group 40 comprising third and fourth sub-groups 42, 44 disposed in fourth and fifth zones 46, 48, respectively, located one on either side outboard of the second group 30. The protrusions of the third group 40 are of substantially equal height and are of less height than the protrusions of the second group 30. As in the case of the first and second groups of protrusions, the protrusions of the third group 40 are conical in configuration and have base diameters of about 0.120-0.130 inch. The third and fourth sub-groups 42, 44 are each disposed on the inside surface 18 of the half-collar 2 in combination with the first and second sub-groups 32, 34, through arcs totaling 180°, less the arc occupied by the first group 20, divided by two.

As may be seen in FIG. 1, the arrangement of protrusions may include a fourth group 50 comprising fifth and sixth sub-groups 52, 54 disposed in sixth and seventh zones 56, 58, respectively, located one on either side outboard of the third group 40. The protrusions of the fourth group 50 are of equal height and are of less height than the protrusions of the third group 40. The protrusions of the fourth group 50 are conical in configuration and have base diameters of about 0.120-0.130 inch. The fifth and sixth sub-groups 52, 54 are each disposed on the inside surface 18 of the collar member 2, and in combination with the first, second, third and fourth sub groups 32, 34, 42, 44, extend through arcs totaling no more than 180° less the arc occupied by the first group 20.

As illustrated in FIG. 1, the arrangement of protrusions preferably includes at least one additional group 60 comprising seventh and eighth sub groups 62, 64 disposed in eighth and ninth zones 66, 68, respectively, located one on either side outboard of the fourth group 50. The protrusions of the additional group 60 are of equal height and are of less height than the protrusions of the fourth group 50. The protrusions of the additional group 60 preferably are conical in configuration and have base diameters of about 0.120-0.130 inch. The seventh and eight sub-groups 62, 64 are each disposed on the inside surface 18 of the collar member 2, in combination with the first through sixth sub-groups through arcs totaling no more than 180° less the arc occupied by the first group 20, and preferably through arcs of about 15° per sub-group.

Thus, in a preferred embodiment there is a first group of protrusions occupying an arc of about 60° on the inside surface of the half-collar, and eight sub-groups of protrusions preferably occupying arcs of about 15° per sub-group.

In the embodiment shown in the drawings, the protrusions of the first group 20, as noted above, preferably have a height of about 0.065-0.075 inch. The height of the protrusions of each succeeding outboard sub-group is less. Preferably, the protrusions of the second group 30 have a height of about 0.055-0.065 inch, the third group 40 about 0.045-0.055 inch, the fourth group 50 about 0.035-0.045 inch, and the additional group 60 about 0.025-0.035 inch.

Figure 5:
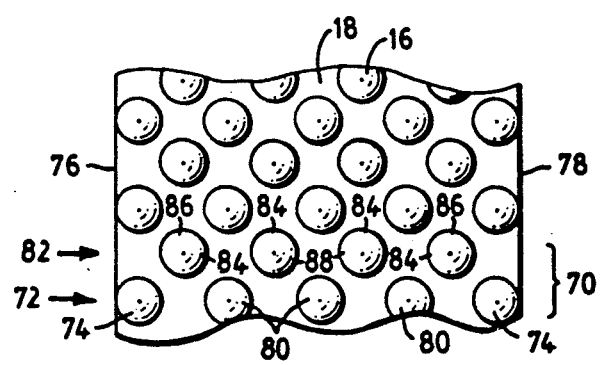
FIG. 5 is a bottom view of a portion of the member of FIG. 1, taken along line V—V of FIG. 1.

Referring to FIG. 5, it will be seen that the protrusions of the first group are arranged in staggered rows 70. In a first 72 of the staggered rows 70, end protrusions 74 are disposed adjacent front and back edges 76, 78 of the collar member. Other first row protrusions 80 are disposed in a straight line between the first row end protrusions 74 and spaced apart by equal distances, the center-to-center distance being about 0.25 inch. In a second 82 of the rows 70, second row protrusions 84 include end protrusions 86 spaced inwardly from the collar member edges 76, 78 and other second row protrusions 88 disposed in a straight line between the second row end protrusions 86 and spaced apart by equal distances, the center-to-center distance being about 0.25 inch. The first and second rows 72, 82 of protrusions are thus staggered and equally spaced to facilitate an evenly distributed gripping force on the pipe within the first group. The protrusions of the remaining group, or groups, are similarly arranged, such that within each group and sub-group, the gripping force is equally distributed.

Figure 6:
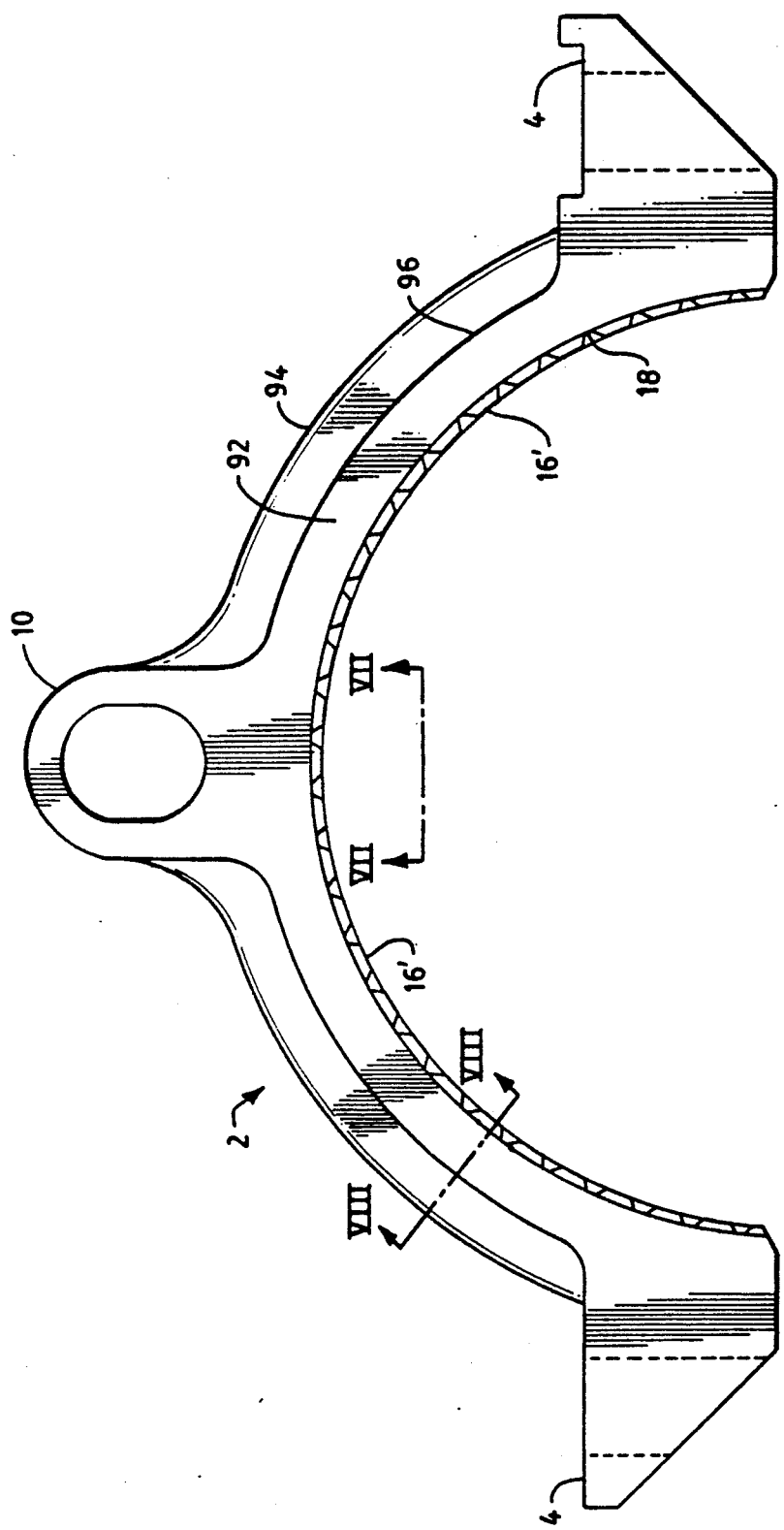
FIG. 6 is a front elevational view of an alternative pipe restraining collar member illustrative of an alternative embodiment of the invention.
Figure 7:
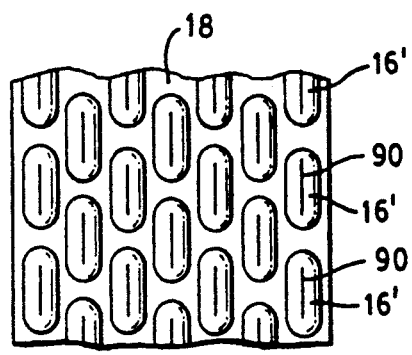
FIG. 7 is a bottom view of a portion of the member of FIG. 6, taken along line VII—VII of FIG. 6.
Figure 8:
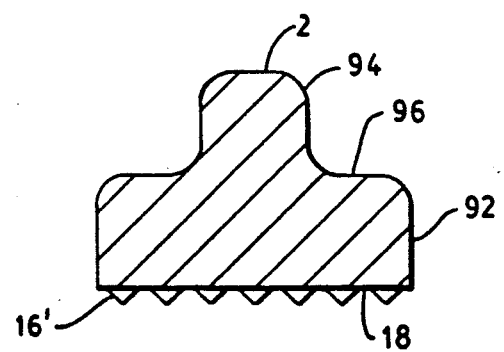
FIG. 8 is a sectional view, taken along line VIII—VIII of FIG. 6.

In FIGS. 6-8 there is shown an alternative embodiment in which there are protrusions 16' which, rather than being of conical configuration, are somewhat elongated but otherwise arranged as described above. The protrusions 16' slope inwardly from their base margins to define elongated central ridges 90 (FIG. 7). The protrusions 16' all have substantially equal base lengths, base widths, and central ridge lengths.

Figure 4:
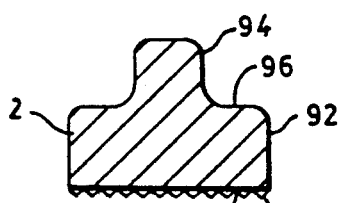
FIG. 4 is a sectional view, taken along line IV—IV of FIG. 1.

While the collar member 2 may comprise a band substantially rectangular in cross-section, it has been found that in order to obtain the desired strength and elasticity in the collar member, it is preferred that the collar member include a band portion 92 (FIGS. 1-4, 6, and 8) having the protrusions 16 or 16' extending from the inside surface 18 thereof, and a reinforcing rib portion 94 upstanding from an external surface 96 of the band portion 92 centrally along the length of the band portion and generally normal to the external surface 96 of the band portion 92 (FIGS. 4 and 8). Preferably, the band portion 92, the rib portion 94, and the lug 10 and flanges 4 are formed integrally with each other and comprise a single casting. The rib portion preferably extends from flange to flange. The combination of band portion 92 and rib portion 94 provides the strength needed to insure longevity of the restrainer in service and the resiliency needed to facilitate initial installation of the restrainer collar member on a pipe. The rib portion 94 further serves to reinforce the flanges 4, and the lug means 10 which, in service, is under stress from the tie bolts 12.

It is to be understood that the present invention is by no means limited to the particular construction herein disclosed and/or shown in the drawings, but also comprises any modifications or equivalents within the scope of the claims. For example, while the drawings and illustrative examples refer to a collar member extending through 180° of arc, it is known that in large diameter pipelines, collar members of less than 180° are used, such as collar members of 120°, requiring three collar members to encircle the pipe, rather than two. In such instances, the discrete groups of protrusions are arranged so as to occupy an arc of 120°, or other selected arc, rather than the 180° described above.

Having thus described my invention, what I claim as new and desire to secure by Letters Patent of the United States is:

1. A pipe restraining member comprising a collar member, flange means disposed on each end of said collar member and adapted to receive first connecting means for connecting said collar member to a support means, said collar member and said support means being adapted cooperatively to encircle a first pipe member, lug means disposed on said collar member and adapted to receive second connecting means for connecting said collar member to a collar assembly encircling a second pipe member, and groups of protrusions extending inwardly from an inside surface of said collar member and adapted to engage an external surface of said first pipe, said groups including a first group of protrusions of greater height than a second group of protrusions, said first group of protrusions being disposed centrally of said collar member as viewed axially of said first pipe member, said first group of protrusions being disposed on said inside surface axially of said collar member and remote from said flange means.

2. The pipe restraining member in accordance with claim 1 wherein said second group of protrusions comprises first and second sub-groups, said fist sub-group being disposed outboard of said first group on a first side of said collar member, and said second sub-group being disposed outboard of said first group on a second side of said collar member.

3. The pipe restraining member in accordance with claim 2 in which said first group of protrusions is disposed on said inside surface of said collar member through an arc of about 30°-90° and said sub-groups are each disposed on said inside surface of said collar member through an arc equal to the total arc of said collar member less the arc occupied by said first group, divided by two.

4. The pipe restraining member in accordance with claim 3 in which the protrusions of said first group have a height of less than about 0.10 inch and the protrusions of said second group have a lesser height than said height of said first group.

5. The pipe restraining member in accordance with claim 2 in which said groups further include a third group of protrusions of lesser height than said second group of protrusions.

6. The pipe restraining member in accordance with claim 5 in which said third group of protrusions comprises third and fourth sub-groups, said third sub-group being disposed outboard of said first sub-group on said first side of said collar member, and said fourth sub group being disposed outboard of said second sub-group on said second side of said collar member.

7. The pipe restraining member in accordance with claim 6 in which said first group of protrusions is disposed on said inside surface of said collar member through an arc of about 30°-90° and said sub-groups are disposed on said inside surface of said collar member through arcs totaling the arc length of said collar member less the arc occupied by said first group.

8. The pipe restraining member in accordance with claim 7 in which the protrusions of said first group have a height of less than about 0.10 inch, the protrusions of said second group have a lesser height than said height of said first group, and the protrusions of said third group have a lesser height than said height of said second group.

9. The pipe restraining member in accordance with claim 6 in which said groups further include a fourth group of protrusions of lesser height than said third group.

10. The pipe restraining member in accordance with claim 9 in which said fourth group of protrusions comprises fifth and sixth sub-groups, said fifth sub-group being disposed outboard of said third sub-group on said first side of said collar member, and said sixth sub-group being disposed outboard of said fourth sub-group on said second side of said collar member.

11. The pipe restraining member in accordance with claim 10 in which said first group of protrusions is disposed on said inside surface of said collar. member through an arc of about 30°-90° and said sub-groups are disposed on said inside surface of said collar member through arcs totaling the arc length of said collar member less the arc occupied by said first group.

12. The pipe restraining member in accordance with claim 11 in which the protrusions of said first group have a height of less than about 0.10 inch, the protrusions of said second group have a lesser height than said height of said first group, the protrusions of said third group have a lesser height than said height of said second group, and the protrusions of said fourth group have a lesser height than said height of said third group.

13. The pipe restraining member in accordance with claim 10 in which said groups further include at least one additional group of protrusions of lesser height than said fourth group.

14. The pipe restraining member in accordance with claim 13 in which said additional group comprises at least one additional sub-group disposed outboard of said fifth sub-group, and at least one further additional sub-group disposed outboard of said sixth sub-group.

15. The pipe restraining member in accordance with claim 14 in which said first group and said sub-groups comprise discrete groups.

16. The pipe restraining member in accordance with claim 14 in which said protrusions are conical in configuration.

17. The pipe restraining member in accordance with claim 16 in which said protrusions have substantially equal base diameters.

18. The pipe restraining member in accordance with claim 14 in which said protrusions are elongated and configured each to have an elongated central ridge.

19. The pipe restraining member in accordance with claim 18 in which said protrusions have substantially equal base widths and lengths, and substantially equal central ridge lengths.

20. The pipe restraining member in accordance with claim 14 in which said first group of protrusions is disposed on said inside surface of said collar member through an arc of about 60° and said sub-groups are disposed on said inside surface of said restraining member through arcs totaling about 120°.

21. The pipe restraining member in accordance with claim 20 in which said sub-groups are each disposed through an arc of about 15°.

22. The pipe restraining member in accordance with claim 20 in which the protrusions of said first group have a height of less than about 0.10 inch, the protrusions of said second group have a lesser height than said height of said first group, the protrusions of said third group have a lesser height than said height of said second group, the protrusions of said fourth group have a lesser height than said height of said third group, and the protrusions of said at least one additional group have a lesser height than said height of said fourth group.

23. The pipe restraining member in accordance with claim 22 in which the protrusions of said first group each have a height of about 0.065–0.075 inch, and the protrusions of said at least one additional group each have a height of less than about 0.035 inch.

24. The pipe restraining member in accordance with claim 22 in which the protrusions of said first group each have a height of about 0.065–0.075 inch, the protrusions of said second group each have a height of about 0.055–0.065 inch, the protrusions of said third group each have a height of about 0.045–0.055 inch, the protrusions of said fourth group each have a height of about 0.035–0.045 inch, and the protrusions of said at least one additional group each have a height of less than about 0.035 inch.

25. The pipe restraining member in accordance with claim 1 in which said groups are discrete groups.

26. The pipe restraining member in accordance with claim 1 in which said protrusions of said groups are conical in configuration.

27. The pipe restraining member in accordance with claim 26 in which said protrusions of said first group have base diameters substantially equal to base diameters of said protrusions in said second group.

28. The pipe restraining member in accordance with claim 1 in which said protrusions of said groups are elongated and configured each to have an elongated central ridge.

29. The pipe restraining member in accordance with claim 28 in which said protrusions of said first group have base widths, base lengths and central ridge lengths substantially equal to base widths, base lengths and central ridge lengths of said protrusions in said second group.

30. The pipe restraining member in accordance with claim 1 wherein said collar member comprises a band portion having said inside surface, and a rib portion upstanding from an external surface of said band portion and centrally thereof substantially along the length of said band portion.

31. The pipe restraining member in accordance with claim 30 wherein said rib extends from a first flange of said flange means to a second flange of said flange means and is generally normal to said band portion external surface.

32. The pipe restraining member in accordance with claim 31 wherein said lug means is integral with said rib portion and said rib portion is integral with said band portion.

* * * * *